United States Patent
Yamasaki et al.

(10) Patent No.: US 6,228,264 B1
(45) Date of Patent: May 8, 2001

(54) METHOD AND APPARATUS FOR BIOLOGICALLY TREATING WASTE WATER CONTAINING FLUORINE

(75) Inventors: Kazuyuki Yamasaki, Hiroshima; Takashi Imai, Fukuyama; Takashi Fujiwara, Ashina-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/328,880

(22) Filed: Jun. 9, 1999

(30) Foreign Application Priority Data

Jun. 16, 1998 (JP) .................................................. 10-168283

(51) Int. Cl.$^7$ ...................................................... C02F 3/30
(52) U.S. Cl. ........................... 210/605; 210/622; 210/623; 210/630; 210/767
(58) Field of Search .................................. 210/601, 605, 210/620, 621, 622, 623, 630, 767

(56) References Cited

U.S. PATENT DOCUMENTS

| | | | |
|---|---|---|---|
| 4,183,808 | * | 1/1980 | Drnevich .................................. 210/5 |
| 4,271,026 | * | 6/1981 | Chen ...................................... 210/605 |
| 4,488,967 | * | 12/1984 | Block et al. .......................... 210/605 |
| 5,393,427 | * | 2/1995 | Barnard ................................. 210/605 |
| 5,423,988 | | 6/1995 | Yamasaki et al. . |
| 5,480,537 | | 1/1996 | Yamasaki et al. . |
| 5,578,214 | | 11/1996 | Yamasaki et al. . |
| 5,580,458 | | 12/1996 | Yamasaki et al. . |
| 5,599,443 | | 2/1997 | Yamasaki et al. . |
| 5,632,885 | | 5/1997 | Yamasaki et al. . |
| 5,676,836 | | 10/1997 | Yamasaki et al. . |
| 5,702,594 | | 12/1997 | Yamasaki et al. . |
| 5,702,604 | | 12/1997 | Yamasaki et al. . |
| 5,707,514 | | 1/1998 | Yamasaki et al. . |
| 5,772,891 | | 7/1998 | Yamasaki et al. . |
| 5,788,838 | | 8/1998 | Yamasaki et al. . |
| 5,804,076 | | 9/1998 | Yamasaki et al. . |
| 5,849,194 | | 12/1998 | Yamasaki et al. . |
| 5,868,934 | | 2/1999 | Yamasaki et al. . |
| 5,895,576 | | 4/1999 | Yamasaki et al. . |
| 6,063,279 | * | 5/2000 | Yamasaki et al. ................... 210/605 |

FOREIGN PATENT DOCUMENTS

| | | |
|---|---|---|
| 05004090 | 1/1993 | (JP) . |
| 06343974 | 12/1994 | (JP) . |
| 09314177 | 12/1997 | (JP) . |

* cited by examiner

Primary Examiner—Chester T. Barry
(74) Attorney, Agent, or Firm—Nixon & Vanderhye

(57) ABSTRACT

A waste water treatment method and apparatus uses microorganism-containing sludge to treat waste water containing fluorine and does not utilize any chemical reaction. For waste water treatment, a treatment tank has an anaerobic part having sludge containing microorganisms and an aerobic part having sludge containing microorganisms and communicating with the anaerobic part. Waste water to be treated and biological excess sludge are introduced into the anaerobic part. Once treated by the microorganisms, the water is filtered by a membranous separation device in the aerobic part, and output as treated water. In the treatment tank, the microorganisms are moved between the anaerobic part and aerobic part to enhance their ability to concentrate or accumulate therein fluorine or other substances contained in the waste water.

11 Claims, 16 Drawing Sheets

Fig.2A (FLUORINE CONCENTRATION: ABOUT 80 ppm) (TOC CONCENTRATION: ABOUT 2,500 ppm)

| NAME OF TANK | RESIDENCE TIME (DAYS) | TIMING (ELAPSED TIME: DAYS) | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| ANAEROBIC TANK | 4 | ─── | ─── | ─── | ─── | | | | | | | | | | |
| AEROBIC TANK | 4 | | | | | ─── | ─── | ─── | ─── | | | | | | |
| FLUORINE-CONCENTRATED SLUDGE TANK | 3 | | | | | | | | | ─── | ─── | ─── | | | |

NECESSARY OPERATING CONDITIONS: THE MLSS CONCENTRATION IS 10,000 ppm OR MORE IN AEROBIC AND ANAEROBIC PARTS

Fig.2B (FLUORINE CONCENTRATION: ABOUT 40 ppm) (TOC CONCENTRATION: ABOUT 2,500 ppm)

| NAME OF TANK | RESIDENCE TIME (DAYS) | TIMING (ELAPSED TIME: DAYS) | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| ANAEROBIC TANK | 3 | ─── | ─── | ─── | | | | | | | | | | | |
| AEROBIC TANK | 3 | | | | ─── | ─── | ─── | | | | | | | | |
| FLUORINE-CONCENTRATED SLUDGE TANK | 3 | | | | | | | ─── | ─── | ─── | | | | | |

NECESSARY OPERATING CONDITIONS: THE MLSS CONCENTRATION IS 10,000 ppm OR MORE IN AEROBIC AND ANAEROBIC PARTS

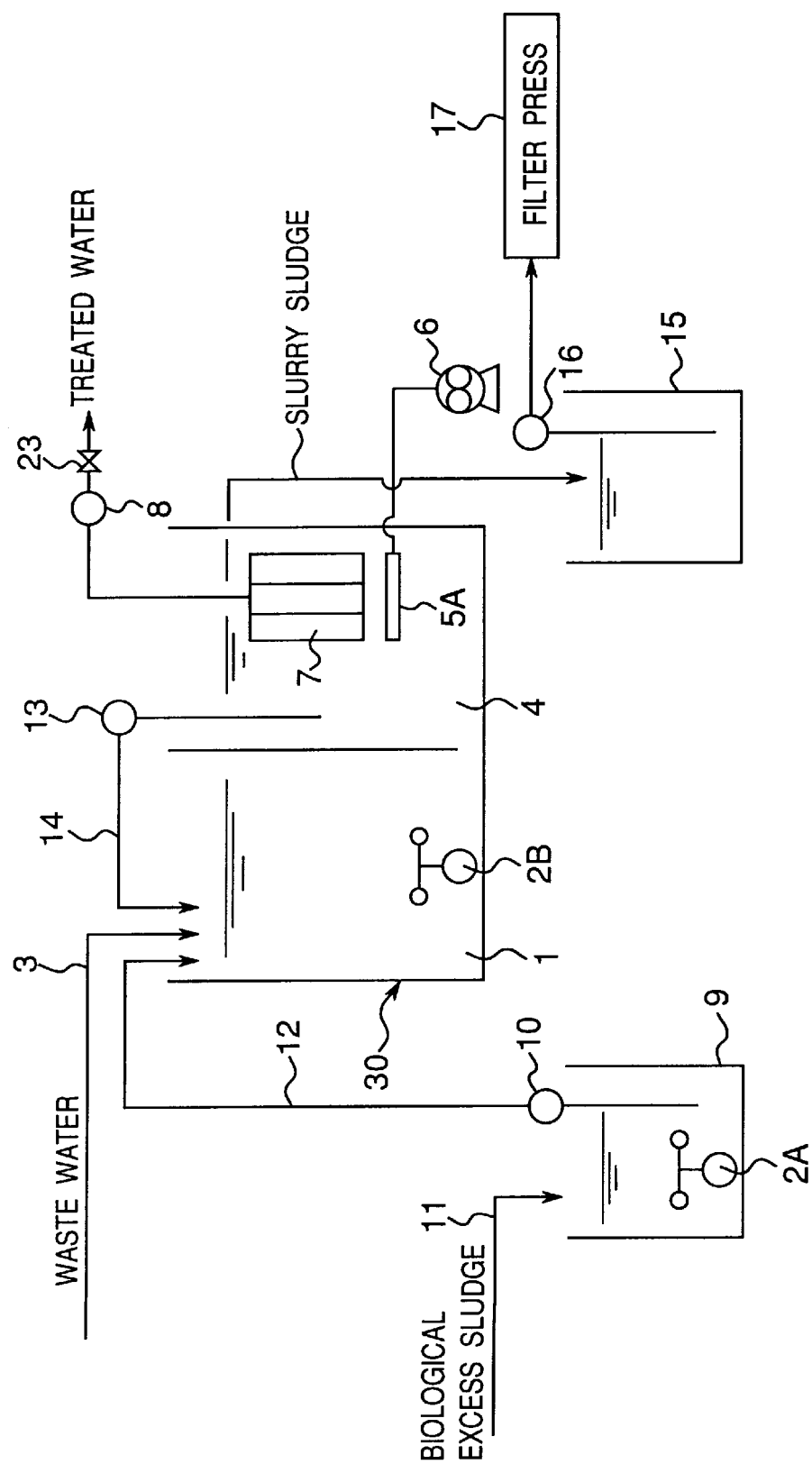

Fig.4A (FLUORINE CONCENTRATION : ABOUT 80 ppm) (TOC CONCENTRATION : ABOUT 2,500 ppm)

| NAME OF TANK | RESIDENCE TIME (DAYS) | TIMING (ELAPSED TIME : DAYS) 1-14 |
|---|---|---|
| ANAEROBIC TANK | 4 | days 1–4 |
| AEROBIC TANK | 4 | days 5–8 |
| FLUORINE-CONCENTRATED SLUDGE TANK | 3 | days 9–11 |

NECESSARY OPERATING CONDITIONS : THE MLSS CONCENTRATION IS 10,000 ppm OR MORE IN AEROBIC AND ANAEROBIC PARTS

Fig.4B (FLUORINE CONCENTRATION : ABOUT 40 ppm) (TOC CONCENTRATION : ABOUT 2,500 ppm)

| NAME OF TANK | RESIDENCE TIME (DAYS) | TIMING (ELAPSED TIME : DAYS) 1-14 |
|---|---|---|
| ANAEROBIC TANK | 3 | days 1–3 |
| AEROBIC TANK | 3 | days 4–6 |
| FLUORINE-CONCENTRATED SLUDGE TANK | 3 | days 7–9 |

NECESSARY OPERATING CONDITIONS : THE MLSS CONCENTRATION IS 10,000 ppm OR MORE IN AEROBIC AND ANAEROBIC PARTS

Fig.6A (FLUORINE CONCENTRATION: ABOUT 80 ppm) (TOC CONCENTRATION: ABOUT 2,500 ppm)

| NAME OF TANK | RESIDENCE TIME (DAYS) | TIMING (ELAPSED TIME: DAYS) 1–14 |
|---|---|---|
| ANAEROBIC TANK | 4 | days 1–4 |
| AEROBIC TANK | 4 | days 5–8 |
| FLUORINE-CONCENTRATED SLUDGE TANK | 3 | days 9–11 |

NECESSARY OPERATING CONDITIONS: THE MLSS CONCENTRATION IS 10,000 ppm OR MORE IN AEROBIC AND ANAEROBIC PARTS

Fig.6B (FLUORINE CONCENTRATION: ABOUT 40 ppm) (TOC CONCENTRATION: ABOUT 2,500 ppm)

| NAME OF TANK | RESIDENCE TIME (DAYS) | TIMING (ELAPSED TIME: DAYS) 1–14 |
|---|---|---|
| ANAEROBIC TANK | 3 | days 1–3 |
| AEROBIC TANK | 3 | days 4–6 |
| FLUORINE-CONCENTRATED SLUDGE TANK | 3 | days 7–9 |

NECESSARY OPERATING CONDITIONS: THE MLSS CONCENTRATION IS 10,000 ppm OR MORE IN AEROBIC AND ANAEROBIC PARTS

Fig.8A (FLUORINE CONCENTRATION: ABOUT 80 ppm) (TOC CONCENTRATION: ABOUT 2,500 ppm)

| NAME OF TANK | RESIDENCE TIME (DAYS) | TIMING (ELAPSED TIME: DAYS) 1-14 |
|---|---|---|
| ANAEROBIC TANK | 4 | days 1–4 |
| AEROBIC TANK | 4 | days 5–8 |
| FLUORINE-CONCENTRATED SLUDGE TANK | 3 | days 9–11 |

NECESSARY OPERATING CONDITIONS: THE MLSS CONCENTRATION IS 10,000 ppm OR MORE IN AEROBIC AND ANAEROBIC PARTS

Fig.8B (FLUORINE CONCENTRATION: ABOUT 40 ppm) (TOC CONCENTRATION: ABOUT 2,500 ppm)

| NAME OF TANK | RESIDENCE TIME (DAYS) | TIMING (ELAPSED TIME: DAYS) 1-14 |
|---|---|---|
| ANAEROBIC TANK | 3 | days 1–3 |
| AEROBIC TANK | 3 | days 4–6 |
| FLUORINE-CONCENTRATED SLUDGE TANK | 3 | days 7–9 |

NECESSARY OPERATING CONDITIONS: THE MLSS CONCENTRATION IS 10,000 ppm OR MORE IN AEROBIC AND ANAEROBIC PARTS

Fig. 10

(FLUORINE CONCENTRATION: ABOUT 160 ppm)　　　(TOC CONCENTRATION: ABOUT 4,000 ppm)

| | RESIDENCE TIME (DAYS) | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| FIRST ANAEROBIC PART | 2 | — | — | | | | | | | | | | | | | | | | | |
| FIRST AEROBIC PART | 2 | | | — | — | | | | | | | | | | | | | | | |
| SECOND ANAEROBIC PART | 2 | | | | | — | — | | | | | | | | | | | | | |
| SECOND AEROBIC PART | 2 | | | | | | | — | — | | | | | | | | | | | |
| THIRD ANAEROBIC PART | 4 | | | | | | | | — | — | — | — | | | | | | | | |
| THIRD AEROBIC PART | 4 | | | | | | | | | | | | | — | — | — | — | | | |
| FLUORINE-CONCENTRATED SLUDGE TANK | 3 | | | | | | | | | | | | | | | | | — | — | — |

TIMING (ELAPSED TIME: DAYS)

NECESSARY OPERATING CONDITIONS: THE MLSS CONCENTRATION IS 10,000 ppm OR MORE IN AEROBIC AND ANAEROBIC PARTS

Fig. 11

(FLUORINE CONCENTRATION: ABOUT 80 ppm)      (TOC CONCENTRATION: ABOUT 4,000 ppm)

| | RESIDENCE TIME (DAYS) | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| FIRST ANAEROBIC PART | 2 | — | | | | | | | | | | | | | | | | | | |
| FIRST AEROBIC PART | 2 | | | — | | | | | | | | | | | | | | | | |
| SECOND ANAEROBIC PART | 2 | | | | — | | | | | | | | | | | | | | | |
| SECOND AEROBIC PART | 4 | | | | | | — | | | | | | | | | | | | | |
| THIRD ANAEROBIC PART | 4 | | | | | | | | — | | | | | | | | | | | |
| THIRD AEROBIC PART | 3 | | | | | | | | | | | — | | | | | | | | |
| FLUORINE-CONCENTRATED SLUDGE TANK | 3 | | | | | | | | | | | | | | | — | | | | |

TIMING (ELAPSED TIME: DAYS)

NECESSARY OPERATING CONDITIONS: THE MLSS CONCENTRATION IS 10,000 ppm OR MORE IN AEROBIC AND ANAEROBIC PARTS

Fig. 13

(FLUORINE CONCENTRATION: ABOUT 160 ppm)     (TOC CONCENTRATION: ABOUT 4,000 ppm)

| | RESIDENCE TIME (DAYS) | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| FIRST ANAEROBIC PART | 2 | ▬ | ▬ | | | | | | | | | | | | | | | | | |
| FIRST AEROBIC PART | 2 | | | ▬ | ▬ | | | | | | | | | | | | | | | |
| SECOND ANAEROBIC PART | 2 | | | | | ▬ | ▬ | | | | | | | | | | | | | |
| SECOND AEROBIC PART | 4 | | | | | | | ▬ | ▬ | ▬ | ▬ | | | | | | | | | |
| THIRD ANAEROBIC PART | 4 | | | | | | | | | | | ▬ | ▬ | ▬ | ▬ | | | | | |
| THIRD AEROBIC PART | 3 | | | | | | | | | | | | | | | ▬ | ▬ | ▬ | | |
| FLUORINE-CONCENTRATED SLUDGE TANK | 3 | | | | | | | | | | | | | | | | | ▬ | ▬ | ▬ |

TIMING (ELAPSED TIME: DAYS)

NECESSARY OPERATING CONDITIONS: THE MLSS CONCENTRATION IS 10,000 ppm OR MORE IN AEROBIC AND ANAEROBIC PARTS

Fig.14

(FLUORINE CONCENTRATION: ABOUT 80 ppm) (TOC CONCENTRATION: ABOUT 4,000 ppm)

| | RESIDENCE TIME (DAYS) | TIMING (ELAPSED TIME: DAYS) | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| FIRST ANAEROBIC PART | 2 | — | — | | | | | | | | | | | | | | | | | |
| FIRST AEROBIC PART | 2 | | | — | — | | | | | | | | | | | | | | | |
| SECOND ANAEROBIC PART | 2 | | | | | — | — | | | | | | | | | | | | | |
| SECOND AEROBIC PART | 2 | | | | | | | — | — | | | | | | | | | | | |
| THIRD ANAEROBIC PART | 4 | | | | | | | | | — | — | — | — | | | | | | | |
| THIRD AEROBIC PART | 4 | | | | | | | | | | | | | — | — | — | — | | | |
| FLUORINE-CONCENTRATED SLUDGE TANK | 3 | | | | | | | | | | | | | | | | | — | — | — |

NECESSARY OPERATING CONDITIONS: THE MLSS CONCENTRATION IS 10,000 ppm OR MORE IN AEROBIC AND ANAEROBIC PARTS

METHOD AND APPARATUS FOR BIOLOGICALLY TREATING WASTE WATER CONTAINING FLUORINE

BACKGROUND OF THE INVENTION

1. Technical Field of the Invention

The present invention relates to a waste water treatment method and apparatus for biologically treating high-concentration organic waste water, and especially waste water containing fluorine discharged from semiconductor factories and liquid crystal factories.

2. Description of Related Art

From the standpoint of the Water Pollution Prevention Law in Japan, it is necessary to treat waste water containing organic matters at high concentration and also containing metal ions or non-metal ions such as fluorine until metal and non-metal ions and organic matters contained therein reach specified concentrations.

Fluorine-containing high-concentration organic waste water hitherto has been treated as follows in the semiconductor factories or the like when the concentration of fluorine contained in the high-concentration organic waste water is as high as 50–100 ppm and the concentration of TOC (total organic carbon) contained therein is also as high as 2000 ppm or more.

The easiest method of treating such fluorine-containing high-concentration organic waste water is to leave the disposal thereof to an industrial waste collector for incineration. In this case, organic matters in the waste water can be disposed easily by incineration. But it is necessary to use chemical agents to chemically treat the fluorine contained in waste gas generated as a result of the incineration. Accordingly, in addition to incineration equipment, equipment for chemically treating the fluorine contained in the waste gas is required. Thus, the treatment system has a complicated construction and in addition, initial and running costs thereof are considerably high.

As another method of treating the fluorine-containing high-concentration organic waste water, it is treated not by incineration but by, initially, a chemical treatment to remove fluorine contained therein and then, diluting the waste water until its concentration becomes so low as to allow a treatment with microorganisms so that organic matters remaining in the waste water are treated. In another treatment method, process steps are carried out in the order opposite to the above method. Initially, the waste water is diluted until its concentration becomes so low as to allow the waste water to be treated with microorganisms, and then organic matters contained therein are treated. After that, fluorine contained in the waste water is chemically treated with slaked lime, calcium carbonate mineral or the like.

On the other hand, apparatuses and methods of treating fluorine waste water which contains organic matters not at a high concentration but at about tens of parts per million (ppm), are known from Japanese Laid-Open Patent Publication No. 5-4090 and Japanese Laid-Open Patent Publication No. 6-343974.

Herein, waster water containing fluorine at 40–100 ppm and organic matters at 2,000–3,000 ppm in TOC concentration is referred to as "fluorine-containing high-concentration organic waste water", and waste water containing fluorine at 30–300 ppm and organic matters at as low as 10–30 ppm in TOC concentration is referred to as "organic matter-containing fluorine waste water".

In the waste water treatment methods disclosed in the Japanese Laid-Open Patent Publication Nos. 5-4090 and 6-343974, waste water is chemically treated first to reduce fluorine and then organic matters contained in the waste water are treated by microorganisms. Both methods are intended for waste water containing organic matters at as small as less than 100 ppm in TOC concentration.

More specifically, in the method disclosed in Japanese Laid-Open Patent Publication No. 5-4090, as shown in FIG. 15 illustrating a system for carrying out the method, a water-soluble calcium compound is added to waste water to be treated in a coagulation and settlement tank 219 to form calcium fluoride, which is then settled. Then, pH of a supernatant liquid is adjusted to 6.5–7.0 in a pH-adjusting tank 220, and then, in an aeration tank 221, through the aeration treatment, the waste water is allowed to contact pellets, to which microorganisms are fixed, to thereby remove BOD (Biochemical Oxygen Demand) components. Then, a coagulation agent or flocculant is added to the waste water in another coagulation and settlement tank 222 to precipitate a remnant fluorine compound along with microorganisms which have leaked out from the pellets.

On the other hand, in the method disclosed in Japanese Laid-Open Patent Publication No. 6-343974, which uses a system shown in FIG. 16, initially, in a first water tank 301 which is filled with a calcium carbonate mineral 307, waste water containing fluorine and the calcium carbonate mineral 307 are allowed to chemically react with each other. Next, in a second water tank 302 which is also filled with calcium carbonate mineral 307, organic matters contained in the waste water are biologically treated by microorganisms propagating on the calcium carbonate mineral 307.

In semiconductor factories manufacturing integrated circuits, technological innovation is made day after day. Because of the use of new chemical agents, waste waters having properties quite different from those of the conventional ones appear. More specifically, a new chemical agent has been developed for use in post-treatment of aluminum wiring etching. The use of that chemical agent causes waste water to contain a mixture of fluorine and high-concentration organic matters.

The chemical agent has a fluorine compound concentration of about 10,000 ppm and a TOC concentration of about 248,000 ppm. The chemical agent is diluted 100 fold with pure water and then drained. That is, the fluorine concentration of the resulting waste water is about 100 ppm, and the TOC concentration thereof is 2,000–3,000 ppm.

In treating such waste water containing fluorine and high-concentration organic matters, the following two methods are conceivable:

(1) Method of leaving the disposal of waste water to industrial waste collector; and (2) Method of chemically and biologically treating waste water.

In the method (1) of leaving the disposal of waste water to an industrial waste collector, in addition to the incineration of waste water, fluorine contained in waste gas must be treated with a chemical agent, as described above. Thus, in addition to incineration equipment, the method requires equipment for chemically treating the fluorine contained in the waste gas. Thus, initial and running costs thereof are considerably high. Further, with this method, waste produced by factories may increase, which does not meet the requirements of the times to reduce waste to be disposed of. Therefore, there is a growing demand for the development of a method that allows factories to easily treat waste water by themselves without increasing the amount of waste.

In the method (2) of chemically and biologically treating waste water, it is possible to reduce the amount of waste. But it is necessary to chemically treat the fluorine with slaked lime or calcium carbonate and in addition, biologically treat high-concentration organic matters by active slurry method or the like. This method, which must dilute the waste water containing the organic matters at a high concentration for the biological treatment, requires treating equipment of complicated construction. Further, the initial cost of the treating equipment and the running cost, e.g., for electricity consumed by a blower, a pump or the like are expensive.

SUMMARY OF THE INVENTION

Therefore, it is an object of the present invention to provide a waste water treatment method and apparatus which is able to biologically treat waste water containing not only organic substances but also fluorine without using chemical agents to reduce initial and running costs remarkably.

In order to accomplish the above object, the present invention provides a method of treating waste water containing fluorine without any chemical treatment, comprising the steps of:

introducing sludge containing microorganisms into a treatment tank;

introducing waste water containing fluorine into the treatment tank; and treating the waste water only biologically using the microorganisms contained in the sludge while increasing a concentration of the microorganisms in the treatment tank, wherein fluorine in the waste water is concentrated in the microorganisms.

Fluorine has toxicity to microorganisms and therefore it has been believed that it is impossible to treat fluorine in waste water with only microorganisms. Therefore, conventionally, chemical agents have been used for fluorine treatment. The applicants, however, found through experiments that microorganisms can take in and concentrate fluorine. The treatment method of the invention utilizes such an ability of microorganisms to concentrate or accumulate therein fluorine or other substances contained in the waste water. This method does not use chemical reaction, and thus no chemical agents such as slaked lime or calcium carbonate are necessary. Therefore, this method can treat water at lower costs than before, and also allows equipment to have a simple construction. Further, the microorganisms have inherently an ability to treat organic matters. Thus, it is possible to treat both fluorine and organic matters contained in the waste water.

In one embodiment, the step of treating the waste water includes a step of moving the microorganisms between an anaerobic part and an aerobic part within the treatment tank, and the step of moving the microorganisms is performed one or more times.

Through movement between the anaerobic part and the aerobic part, the ability of the microorganisms to concentrate fluorine and other substances is increased to a higher extent, and yet the organic matter concentrating capability of the microorganisms does not deteriorate. Thus, waste water containing fluorine and organic matter is well treated only with the microorganisms. The ability of the microorganisms to concentrate fluorine is not increased by merely placing the microorganisms in an aerobic. Changing the microorganisms from the anaerobic state to the aerobic state enhances this ability.

In one embodiment, the method further comprises a step of filtering the waste water to separate the sludge from the waste water and output the filtered water as treated water, and the step of filtering the waste water is performed in the aerobic part at a final stage of the treatment.

With this construction, the concentration of microorganisms in the aerobic part can be increased to as high as about 10,000 ppm in terms of MLSS. Because the concentration of the microorganisms in the aerobic part is high, it is possible to store a great amount of fluorine in the microorganism-containing sludge. In addition, it is possible to treat high-concentration organic matters efficiently without diluting the waste water.

The method may further comprise a step of returning the sludge from the aerobic part to the anaerobic part at the final stage of the treatment.

With this arrangement, the microorganisms contained in the sludge increase their ability to concentrate fluorine because they pass through the anaerobic part and the aerobic part.

Further, the return of the microorganism-containing sludge from the aerobic part to the anaerobic part allows the concentration of the microorganisms in the aerobic part and that in the anaerobic part to be equal to each other. Consequently, the entire treatment tank has microorganisms at a high concentration and therefore has an increased treatment efficiency. If the microorganism-containing sludge is not returned to the aerobic part from the anaerobic part, the concentration of the microorganisms in the aerobic part becomes higher than that in the anaerobic part. Thus, the concentration of the microorganisms in the aerobic part and the concentration thereof in the anaerobic part will be out of balance.

In one embodiment, in the step of introducing sludge, a biological excess sludge is introduced into the treatment tank.

The biological excess sludge often contains phosphorus that is necessary for propagation of microorganisms. Therefore, supply of such sludge to the treatment tank facilitates the propagation of the microorganisms in the sludge. Further, it is easy to maintain an anaerobic state by increasing the concentration of the microorganisms in the treatment tank and cutting off air therefrom.

That is, the biological excess sludge is introduced into the treatment tank to increase the concentration of microorganisms in the anaerobic part to thereby maintain an anaerobic state of the anaerobic part in a sufficient degree. Then, an aerobic state is maintained in a sufficient degree in the aerobic part to have fluorine taken into the sludge containing microorganisms at a high concentration.

In one embodiment, the sludge containing fluorine concentrated in the microorganisms is discharged from the treatment tank after a concentration of the microorganisms in the treatment tank reaches a predetermined value.

The method of the invention can be carried out by an apparatus according to another aspect of the invention, which comprises:

a treatment tank for treating waste water containing fluorine only biologically and without any chemical treatment, the treatment tank includes:

an anaerobic part having sludge containing microorganisms; and an aerobic part having sludge containing microorganisms, and communicating with the anaerobic part, wherein fluorine in the waste water is concentrated within the microorganisms.

In one embodiment, the anaerobic part has an agitator, and the aerobic part has an air diffusion pipe and a membranous separation device disposed above the air diffusion pipe for filtering the waste water.

The membranous separation device, such as an ultrafiltration membrane or a precision filtration membrane, which are commercially available, can securely separate the sludge inclusive of the microorganisms from water mechanically. On the other hand, air discharged from the air diffusion pipe always washes the membranous separation device. Thus, the membranous separation device is prevented from clogging.

In one embodiment, the anaerobic part and the aerobic part are juxtaposed with each other.

In one embodiment, the anaerobic part and the aerobic part are arranged vertically such that the aerobic part is located in an upper position than the anaerobic part, the aerobic part abuts on the anaerobic part at a partitioning wall. In this case, the apparatus is installed in a smaller space than in the case that the anaerobic part and the aerobic part are juxtaposed with each other. Furthermore, owing to the gravity, the microorganism-containing sludge falls from the aerobic part above to the anaerobic part below and sediments in the anaerobic part. Thus, the concentration of microorganisms in the anaerobic part is increased and the anaerobic condition therein is maintained, which contributes to the increase in the ability of the microorganisms to concentrate fluorine.

In one embodiment, the treatment tank has a plurality of chambers which are juxtaposed with each other and which each have the anaerobic part and the aerobic part, the anaerobic part and the aerobic part in each chamber are arranged vertically such that the aerobic part is located in an upper position than the anaerobic part, the aerobic part abuts on the anaerobic part at a partitioning wall, and the adjacent chambers communicate each other at the aerobic parts or anaerobic parts.

Other objects and features of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is an operation time chart in the first embodiment when fluorine and TOC each have a normal concentration;

FIG. 2B is an operation time chart in the first embodiment when fluorine has a low concentration and TOC has a normal concentration;

FIG. 3 schematically shows the construction of a waste water treatment apparatus according to a second embodiment of the present invention;

FIG. 4A is an operation time chart in the second embodiment when fluorine and TOC each have a normal concentration;

FIG. 4B is an operation time chart in the second embodiment when fluorine has a low concentration and TOC has a normal concentration;

FIG. 6A is an operation time chart in the third embodiment when fluorine and TOC each have a normal concentration;

FIG. 6B is an operation time chart when fluorine has a low concentration and TOC has a normal concentration in the third embodiment;

FIG. 8A is an operation time chart in the fourth embodiment when fluorine and TOC each have a normal concentration;

FIG. 8B is an operation time chart in the fourth embodiment when fluorine has a low concentration and TOC has a normal concentration;

FIG. 10 is an operation time chart for the fifth embodiment when fluorine and TOC each have a high concentration;

FIG. 11 is an operation time chart for the fifth embodiment when fluorine has a normal concentration and TOC has a high concentration;

FIG. 13 is an operation time chart for the sixth embodiment when fluorine and TOC each have a high concentration;

FIG. 14 is an operation time chart for the fifth embodiment when fluorine has a normal concentration and TOC has a high concentration;

DETAILED DESCRIPTION OF THE PREFERRED EMBODIMENTS

The embodiments of the present invention will be described below with reference to the drawings.

[First Embodiment]

Figure 1:
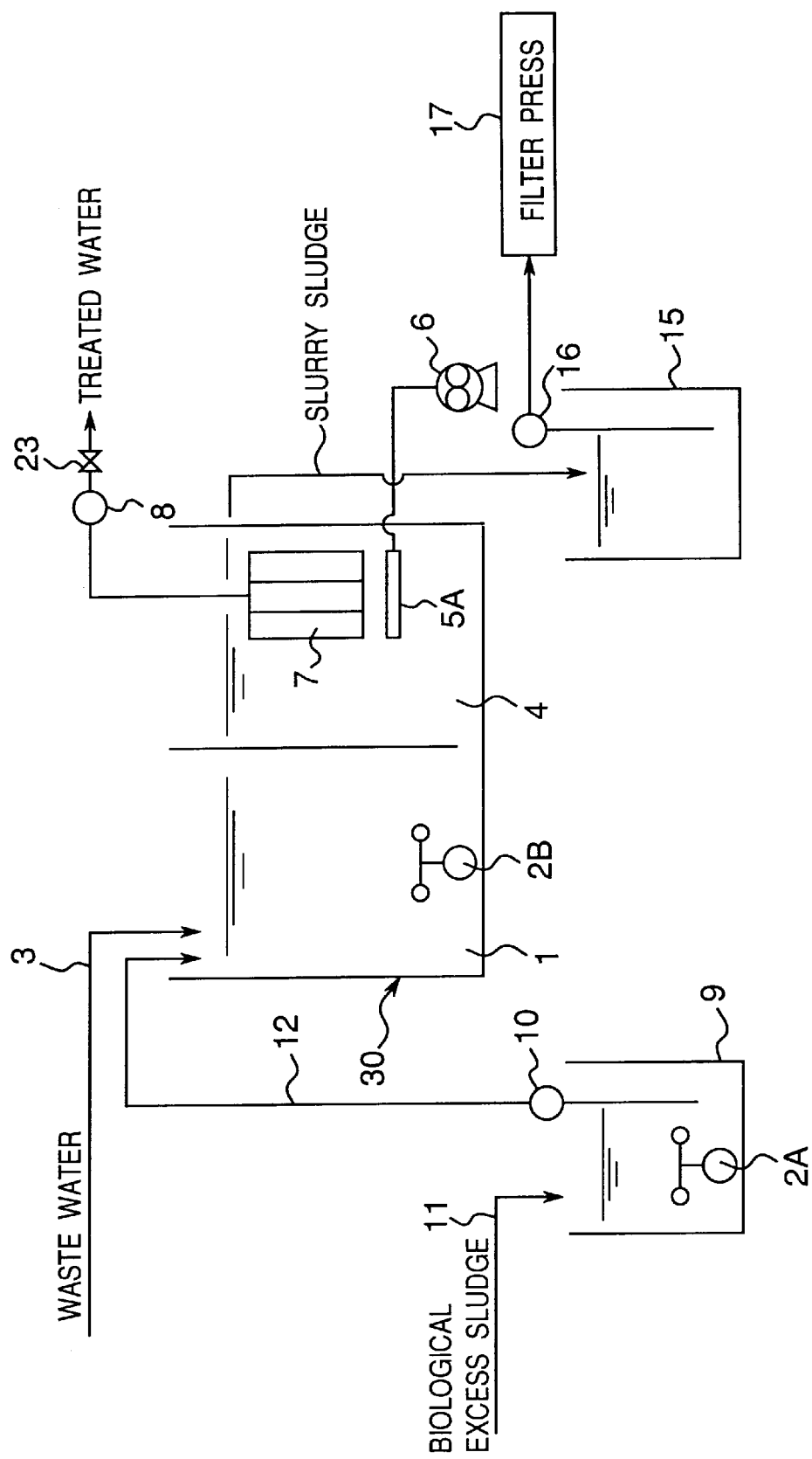
FIG. 1 schematically shows the construction of a waste water treatment apparatus according to a first embodiment of the present invention.

FIG. 1 shows the waste water treatment apparatus of a first embodiment of the present invention. The waste water treatment apparatus includes a biological excess sludge tank having a submersible agitator 2A, a main treatment tank 30 having an anaerobic tank 1 and an aerobic tank 4, and a fluorine-concentrated sludge tank 15.

In the waste water treatment apparatus, fluorine-containing high-concentration organic waste water is introduced into the anaerobic tank 1 of the main treatment tank 30 through an inlet pipe 3.

Biological excess sludge is introduced through an excess sludge pipe 11 into the biological excess sludge tank 9 in which the submersible agitator 2A is installed. The biological excess sludge introduced into the biological excess sludge tank 9 is agitated by the submersible agitator 2A and then fed into the anaerobic tank 1 by a biological excess sludge pump 10 through a transfer pipe 12. In the biological excess sludge tank 9, the submersible agitator 2A agitates the sludge therein to make the water quality thereof uniform and keep an anaerobic state. A submersible agitator 2B installed in the anaerobic tank 1 also makes the water quality of the anaerobic tank 1 uniform and keeps an anaerobic state. Because neither the biological excess sludge tank 9 nor the anaerobic tank 1 has a device for introducing air thereinto, the anaerobic state is maintained therein.

The fluorine-containing high-concentration organic waste water introduced into the anaerobic tank 1 of the main treatment tank 30 is mixed with the biological excess sludge already adjusted to be anaerobic, and treated anaerobically in the anaerobic tank 1.

The residence time of the fluorine-containing high-concentration organic waste water in the anaerobic tank 1 is preferably four days or more, which is not an absolute condition. That is, basically, the residence time of the waste water should be determined on the basis of the concentrations of the fluorine and the organic matters contained therein. Actually, the residence time is determined in consideration of the concentration of microorganisms (MLSS: Mixed Liquor Suspended Solid) in the anaerobic tank 1, the concentration of the biological excess sludge introduced into the anaerobic tank 1, and the temperature of the waste water as well as the fluorine concentration and the organic concentration. When the fluorine concentration is low, a short residence time is set. The concentration of the organic matters has a smaller influence on the setting of the residence time of the waste water than the concentration of the fluorine.

The waste water in the anaerobic tank 1 flows into the aerobic tank 4 which abuts on and communicates with the anaerobic tank 1 at a lower portion thereof. The aerobic tank 4 has a submersible separation membrane 7 and an air diffusion pipe 5A positioned below the separation membrane 7. The air diffusion pipe 5A is supplied with air from a blower 6. Air discharged from the air diffusion pipe 5A cleans the separation membrane 7.

The air discharged from the air diffusion pipe 5A keeps the aerobic tank 4 aerobic and serves for agitation of the content of the aerobic tank 4. As the submersible separation membrane 7, an ultrafiltration membrane or a precision filtration membrane can be used.

The separation membrane 7 separates the waste water treated aerobically in the aerobic tank 4 into treated water and sludge. Only the treated water is made to flow out of the aerobic tank 4 by a treated-water pump 8 and a valve 23. Owing to the operation of the separation membrane 7, the microorganism-containing sludge is prevented from flowing out from the aerobic tank 4 through the treated-water pump 8 and the valve 23. Thus, the water quality of treated water is comparatively stable. Because the diameters of pores of the separation membrane 7 range from 0.1 to 0.3 microns, microorganisms such as bacteria cannot pass the separation membrane 7. The residence time of the fluorine-containing high-concentration organic waste water in the aerobic tank 4 is preferably four days or more, which is, however, not an absolute condition, similarly to the anaerobic tank 1.

As a result of their passage through the anaerobic tank 1 and the aerobic tank 4, the microorganisms contained in the biological excess sludge improve their capability of concentrating or collecting the fluorine within the microorganisms. Thus, it is possible to concentrate the fluorine contained in the waste water. Accordingly, in addition to the treatment of high-concentration organic matters contained in the waste water, the fluorine can be concentrated or absorbed into the microorganism-containing sludge. Removal of the microorganism-containing sludge from the main treatment tank 30 results in the treatment of both the high-concentration organic matters and the fluorine in the waste water.

Introduction of the biological excess sludge into the anaerobic tank 1 increases the concentration of the microorganisms in the anaerobic tank 1 and the aerobic tank 4 with elapse of time. When MLSS (mixed liquor suspended solid) indicating the concentration of the microorganism rises to 10,000 ppm, the discharge amount of the treated-water pump 8 is reduced with the valve 23 to raise the water level of the main treatment tank and let the slurry sludge (microorganisms) flow automatically into the fluorine-concentrated sludge tank 15 from the aerobic tank 4.

The slurry sludge discharged from the aerobic tank 4 is an aggregation of microorganisms containing the concentrated fluorine. Thus, by introducing the slurry sludge from the aerobic tank 4 into the fluorine-concentrated sludge tank 15, the fluorine is removed from the waste water. In the conventional fluorine-treating method, a chemical reaction into calcium fluoride is used. But in the fluorine-treating method of the present invention, the fluorine in the waste water is removed by biophysically concentrating or accumulating the fluorine in the microorganisms and transferring the sludge containing those microorganisms to the fluorine-concentrated sludge tank 15.

The microorganism-containing sludge may be transferred from the aerobic tank 4 to the fluorine-concentrated sludge tank 15 successively or intermittently. From the standpoint of treatment of the waste water and judging from the stability of the waste water treatment system, it is preferable to transfer it successively. That is, the biological excess sludge is successively introduced into the anaerobic tank 1 to concentrate or accumulate fluorine ions in the microorganism-containing sludge, and the microorganism-containing sludge with the concentrated fluorine is successively taken out from the main treatment tank 30. In this manner, fluorine is removed from the waste water.

The biological excess sludge increases its fluorine concentration capability gradually as the sludge passes through the anaerobic tank 1 and the aerobic tank 4. The microorganism-containing sludge resulting from the treatment of the organic matters contained in the waste water concentrates fluorine ions within it and flows into the fluorine-concentrated sludge tank 15. In this manner, the fluorine is removed from the waste water.

For dehydration, the sludge, which has moved to the fluorine-concentrated sludge tank 15, is introduced into a filter press 17 by a filter press pump 16.

FIG. 2A shows an example of the residence time of waste water in each tank when the fluorine concentration is normal (about 80 ppm) and the TOC concentration is normal (about 2,500 ppm). In the example, the residence time in the anaerobic tank 1, the aerobic tank 4, and the fluorine-concentrated sludge tank 15 is four days, four days, and three days, respectively. The MLSS concentration in the aerobic tank 4 and that in the anaerobic tank 1 are set to 10,000 ppm or more.

FIG. 2B shows an example of the residence time of waste water in each tank when the concentration of fluorine is low (about 40 ppm). In the example, the residence time in the anaerobic tank 1, the aerobic tank 4, and the fluorine-concentrated sludge tank 15 is all three days. The MLSS concentration in the aerobic tank 4 and that in the anaerobic tank 1 are set to more than 10,000 ppm.

[Second Embodiment]

FIG. 3 shows the waste water treatment apparatus of a second embodiment of the present invention. The waste water treatment apparatus is different from that of the first embodiment only in that in the second embodiment, a circulation pump 13 is additionally installed above the aerobic tank 4 to return slurry sludge in the aerobic tank 4 to the anaerobic tank 1 through a circulation pipe 14.

Accordingly, in the second embodiment, points of the second embodiment different from the first embodiment are mainly described below.

In the second embodiment, the slurry sludge (microorganisms) in the aerobic tank 4 is returned to the anaerobic tank 1 by the circulation pump 13 and the circulation pipe 14. Thus, the microorganism-containing sludge circulates between the anaerobic tank 1 and the aerobic tank 4. That is, microorganisms contained in the sludge move between the anaerobic tank 1 and the aerobic tank 4. Owing to this construction, the second embodiment allows the fluorine concentrating capability of microorganisms to be higher than the first embodiment. Accordingly, the second embodiment is superior to the first embodiment in fluorine removal percentage.

It has been confirmed experimentally that placing the microorganisms in the sludge in an aerobic state and an anaerobic state alternately enhances the metal and nonmetal ion concentrating capability of the microorganisms.

Further, because the waste water treatment apparatus of the second embodiment has the circulation pump 13, it is possible to allow the concentration of the microorganisms in the anaerobic tank 1 and that in the aerobic tank 4 to be equal to each other and high as a whole. Further, because the microorganism-containing sludge circulates between the anaerobic tank 1 and the aerobic tank 4, the waste water treatment apparatus of the second embodiment allows the microorganism-containing sludge to have a higher fluorine concentrating capability than that of the first embodiment. That is, the waste water treatment system of the second embodiment as a whole is capable of treating the organic matters and the fluorine to a higher extent than that of the first embodiment.

FIG. 4A shows an example of the residence time of waste water in each tank when the concentration of fluorine is normal (about 80 ppm) and the TOC concentration is also normal (about 2,500 ppm). In the example, the residence time in the anaerobic tank 1, the aerobic tank 4, and the fluorine-concentrated sludge tank 15 is four days, four days, and three days, respectively. The MLSS concentration in the aerobic tank 4 and that in the anaerobic tank 1 are set to 10,000 ppm or more.

FIG. 4B shows an example of the residence time of the waste water in each tank when the concentration of fluorine is low (about 40 ppm) and the TOC concentration is normal (about 2,500 ppm). In the example, the residence time in the anaerobic tank 1, the aerobic tank 4, and the fluorine-concentrated sludge tank 15 is all three days. The MLSS concentration in the aerobic tank 4 and that in the anaerobic tank 1 are set to 10,000 ppm or more.

[Third Embodiment]

Figure 5:
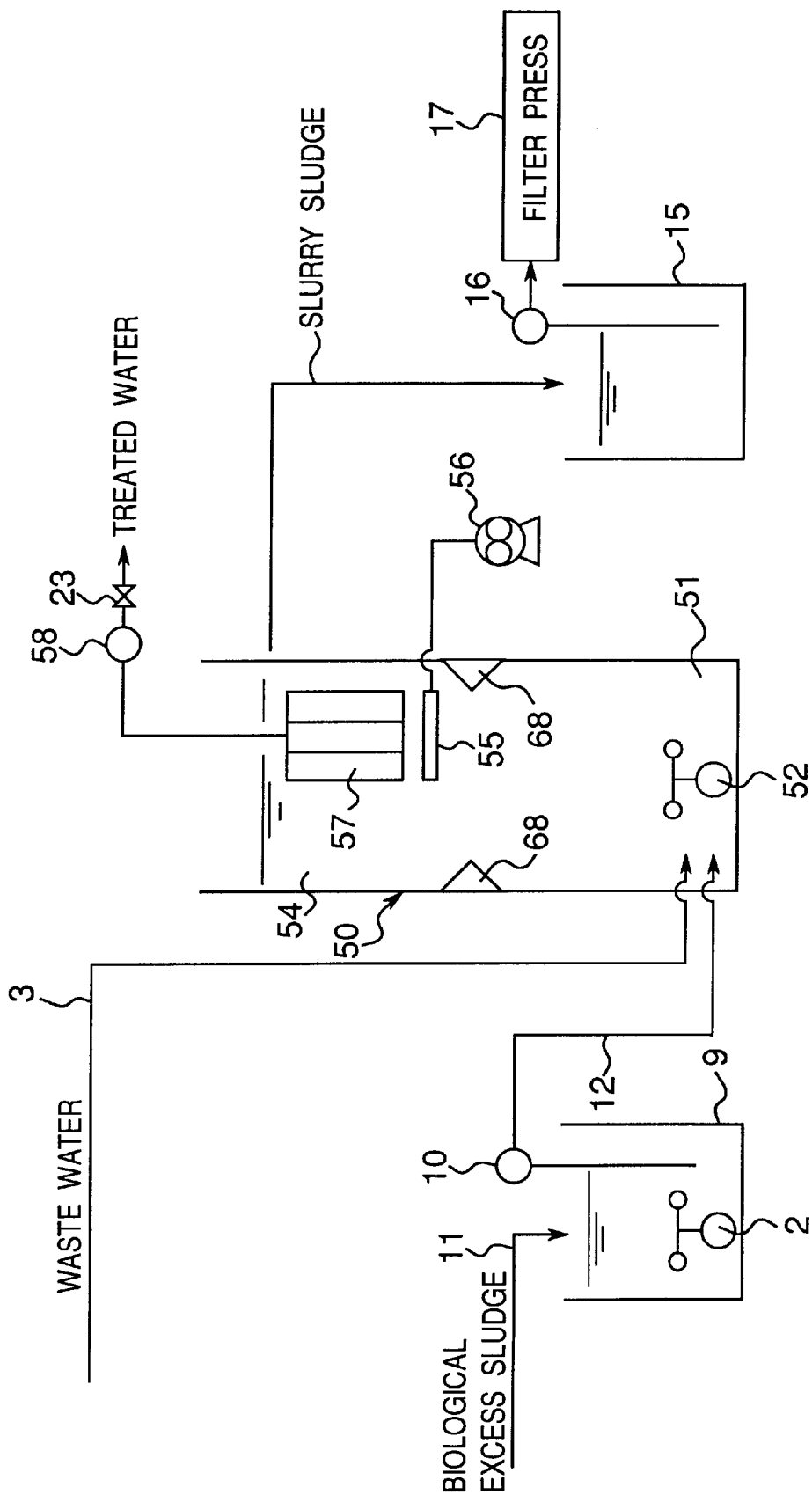
FIG. 5 schematically shows the construction of a waste water treatment apparatus according to a third embodiment of the present invention.

FIG. 5 shows the waste water treatment apparatus of a third embodiment of the present invention. The waste water treatment apparatus is different from that of the first embodiment only in that in the third embodiment, a main treatment tank 50 replaces the main treatment tank 30 of the first embodiment. Accordingly, points of the third embodiment different from the first embodiment will be mainly described below.

The main treatment tank 50 is constructed of an aerobic part 54 in an upper position and an anaerobic part 51 in a lower position. The aerobic part 54 and the anaerobic part 51 adjoin each other at a partitioning wall 68 formed therebetween. The partitioning wall 68 is fixed to the inner walls of the main treatment tank 50 in the vertically central position and around the entire periphery of the inner walls. The partitioning wall 68 tapers inward in a horizontal direction.

The anaerobic part 51 has a submersible agitator 52 in the proximity to a bottom portion thereof. The aerobic part 54 has an air diffusion pipe 55 located proximately to the partitioning wall 68 and extending horizontally, and a separation membrane 57 positioned above the air diffusion pipe 55. The air diffusion pipe 55 is connected with a blower 56. Through a pipe, an upper portion of the separation membrane 57 is connected with a treated-water pump 58 and the valve 23 both located outside the main treatment tank 50.

In the third embodiment, the fluorine-containing high-concentration organic waste water is introduced through the inlet pipe 3 into the bottom portion of the anaerobic part 51 of the main treatment tank 50. The biological excess sludge is introduced from the biological excess sludge tank 9 into the bottom portion of the anaerobic part 51 of the main treatment tank 50 via the transfer pipe 12.

At the bottom portion of the anaerobic part 51, the waste water and the biological excess sludge are agitated by the submersible agitator 52. Thus, the waste water is anaerobically treated in the anaerobic part 51 and aerobically treated in the aerobic part 54.

In the third embodiment, the partitioning wall 68 is provided between the aerobic part 54 and the anaerobic part 51, as shown in FIG. 5, so that an upward water current or flow generated by the air diffusion pipe 55 within the aerobic part 54 is prevented from adversely affecting the anaerobic part 51 below.

In the third embodiment, because the anaerobic part 51 is positioned below the aerobic part 54, microorganisms in the aerobic part 54 fall by the gravity into the anaerobic part 51. Accordingly, the anaerobic part 51 of the third embodiment has a higher concentration of the microorganisms than the anaerobic tank (anaerobic part) 1 of the first embodiment. Consequently, the microorganism-containing sludge becomes sufficiently anaerobic in the anaerobic part 51. In an anaerobic state, the microorganism-containing sludge does not concentrate fluorine ions contained in the waste water. But, upon being placed in the subsequent aerobic state, the microorganism-containing sludge, which has undergone the anaerobic state to a sufficient extent, has an improved fluorine-concentrating capability.

Further, because the anaerobic part 51 and the aerobic part 54 are arranged vertically, the waste water treatment apparatus of the third embodiment can be installed in a smaller area than that of the first embodiment.

As the concentration of the microorganisms in the aerobic part 54 and the anaerobic part 51 becomes higher, the aerobic state in the aerobic part 54 and the anaerobic state in the anaerobic part 51 become increasingly conspicuous. The reason is as follows. When the concentration of microorganisms in the anaerobic part 51 is low, there is a case in which oxygen in the waste water remains in the anaerobic part 51 without being consumed by the microorganisms. On the other hand, when the concentration thereof in the anaerobic part 51 is high, oxygen present in the waste water is sufficiently consumed by the microorganisms. Thus, the anaerobic part 51 has a conspicuously anaerobic state. Because the air diffusion pipe 55 always supplies the aerobic part 54 with oxygen of air, the aerobic part 54 is always aerobic. When the concentration of microorganisms is 6,000 ppm or more in terms of MLSS, the aerobic state in the aerobic part 54 and the anaerobic state in the anaerobic part 51 become conspicuous.

FIG. 6A shows an example of the residence time of waste water in each part when the concentration of fluorine is normal (about 80 ppm) and the TOC concentration is normal (about 2,500 ppm). In the example, the residence time in the anaerobic part 51, the aerobic part 54, and the fluorine-concentrated sludge tank 15 is four days, four days, and three days, respectively. The MLSS concentration in the aerobic part 54 and that in the anaerobic part 51 are set to 10,000 ppm or more.

FIG. 6B shows an example of the residence time of waste water in each part when the concentration of fluorine is low (about 40 ppm) and the TOC concentration is normal (about 2,500 ppm). In the example, the residence time in the anaerobic part 51, the aerobic part 54, and the fluorine-concentrated sludge tank 15 is all three days. The MLSS concentration in the aerobic part 54 and that in the anaerobic part 51 are set to 10,000 ppm or more.

[Fourth Embodiment]

Figure 7:
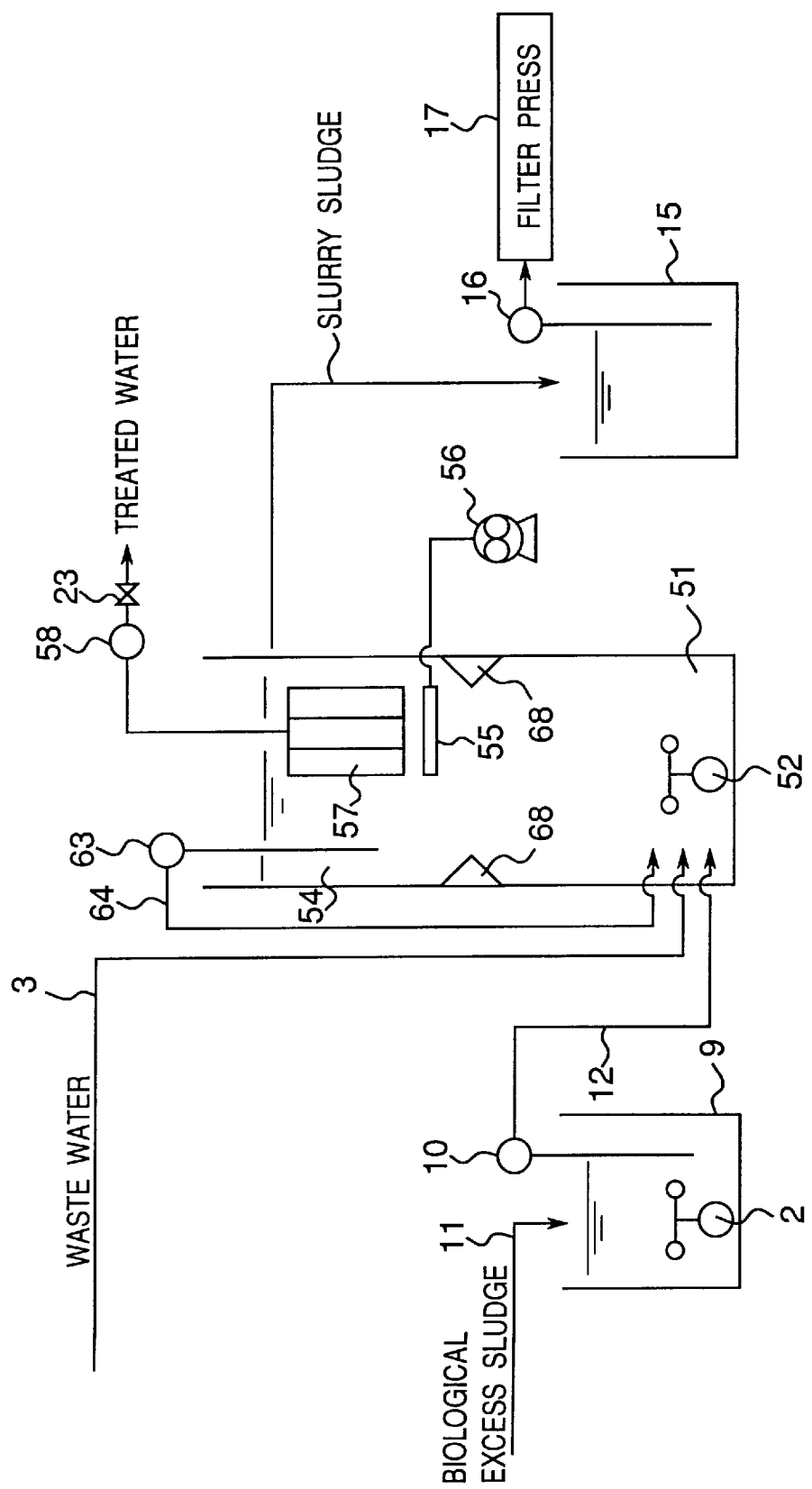
FIG. 7 schematically shows the construction of a waste water treatment apparatus according to a fourth embodiment of the present invention.

FIG. 7 shows the waste water treatment apparatus of a fourth embodiment of the present invention. The waste water treatment apparatus is different from that of the third embodiment basically in that the former has a circulation pipe 64 extending from the aerobic part 54 to the bottom portion of the anaerobic part 51. Accordingly, points of the fourth embodiment different from the third embodiment will be mainly described.

A circulation pump 63 is installed on the circulation pipe 64. The circulation pump 63 is driven to return slurry sludge in the aerobic part 54 to the bottom portion of the anaerobic part 51 via the circulation pipe 64.

Accordingly, in the fourth embodiment, microorganism-containing sludge circulate between the anaerobic part 51 and the aerobic part 54. That is, microorganisms move between the anaerobic tank 51 and the aerobic tank 54. Owing to this arrangement, the fourth embodiment allows the fluorine concentrating capability of microorganisms to be higher than the third embodiment. Accordingly, the fourth embodiment is superior to the third embodiment in fluorine removal percentage. The circulation of the microorganisms between the anaerobic tank 51 and the aerobic tank 54 allows the concentration of microorganisms in the anaerobic part 51 and that in the aerobic part 54 to be equal to each other.

FIG. 8A shows an example of the residence time of waste water in each part when the concentration of fluorine is normal (about 80 ppm) and the TOC concentration is normal (about 2,500 ppm). In the example, the residence time in the anaerobic part 51, the aerobic part 54, and the fluorine-concentrated sludge tank 15 is four days, four days, and three days, respectively. The MLSS concentration in the aerobic part 54 and that in the anaerobic part 51 are set to 10,000 ppm or more.

FIG. 8B shows an example of the residence time of waste water in each part when the concentration of fluorine is low (about 40 ppm) and the TOC concentration is normal (about 2,500 ppm). In the example, the residence time in the anaerobic part 51, the aerobic part 54, and the fluorine-concentrated sludge tank 15 is all three days. The MLSS concentration in the aerobic part 54 and that in the anaerobic part 51 are set to 10,000 ppm or more.

[Fifth Embodiment]

Figure 9:
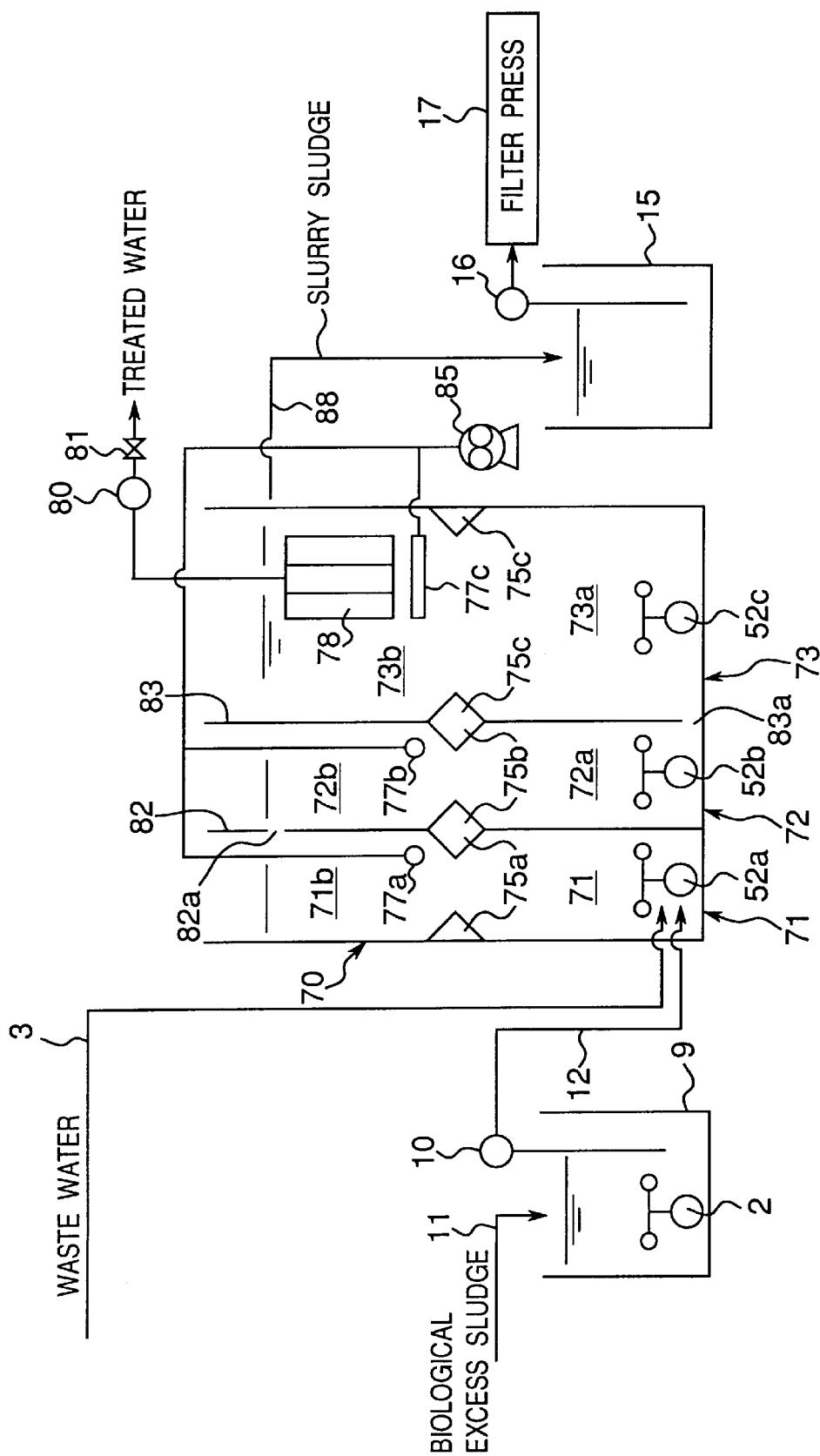
FIG. 9 schematically shows the construction of a waste water treatment apparatus according to a fifth embodiment of the present invention.

FIG. 9 shows the waste water treatment apparatus of a fifth embodiment of the present invention. The waste water treatment apparatus of the fourth embodiment is different from that of the third embodiment in that in the fifth embodiment, a main treatment tank 70 having a three-stage construction replaces the main treatment tank 50 of the third embodiment. Accordingly, the main treatment tank 70 will be mainly described below.

The main treatment tank 70 includes a first chamber 71, a second chamber 72, and a third chamber 73. The first chamber 71 adjoins the second chamber 72, which in turn adjoins the third chamber 73.

The first chamber 71 has a first anaerobic part 71a positioned at a lower side thereof and a first aerobic part 71b positioned at an upper side thereof. The first anaerobic part 71a and the first aerobic part 71b abuts on each other at a partitioning wall 75a. The partitioning wall 75a is fixed to the side walls of the first chamber 71 in the vertically central position and around the entire periphery of the side walls. The partitioning wall 75a tapers inward in a horizontal direction. The first anaerobic part 71a has a submersible agitator 52a installed on a bottom thereof. The first aerobic part 71b has an air diffusion pipe 77a installed proximate to a bottom portion thereof. The air diffusion pipe 77a is opposed to the partitioning wall 75a vertically and connected with a blower 85.

The second chamber 72 has a second anaerobic part 72a and a second aerobic part 72b. The second anaerobic part 72a abuts on the second aerobic part 72b at a partitioning wall 75b fixed to the side walls of the second chamber 72 at approximately the center thereof in a vertical direction. The partitioning wall 75b tapers inward in a horizontal direction. The second anaerobic part 72a has a submersible agitator 52b at a bottom portion thereof. The second aerobic part 72b has an air diffusion pipe 77b installed proximate to a bottom portion thereof. The air diffusion pipe 77b is opposed to the partitioning wall 75b vertically and connected with the blower 85.

The third chamber 73 has a third anaerobic part 73a in a lower position and a third aerobic part 73b in an upper position. The third anaerobic part 73a adjoins the third aerobic part 73b at a partitioning wall 75c fixed to the side walls of the third chamber 73 at approximately the center thereof in a vertical direction. The partitioning wall 75c tapers inward in a horizontal direction. The third anaerobic part 73a has a submersible agitator 52c at the bottom thereof. The third aerobic part 73b has an air diffusion pipe 77c installed proximate to a bottom portion thereof. The air diffusion pipe 77c is disposed close to the partitioning wall 75c and connected with the blower 85. A separation membrane 78 is installed above the air diffusion pipe 77c. The separation membrane 78 is connected at its upper portion with a pump 80 and a valve 81 through a pipe.

A communication hole 82a for communicating the first chamber 71 with the second chamber 72 is formed at an upper portion of the wall 82 that separates the first chamber 71 and the second chamber 72 from each other. Also, a communication hole 83a for communicating the second chamber 72 with the third chamber 73 is formed at a lowermost portion of the wall 83 that separates the second chamber 72 from the third chamber 73.

In the fifth embodiment, initially, fluorine-containing high-concentration organic waste water is introduced into the first anaerobic part 71a of the main treatment tank 70 through the inlet pipe 3. On the other hand, biological excess sludge is introduced into the first anaerobic part 71a from the biological excess sludge tank 9 via the transfer pipe 12. At the bottom portion of the first anaerobic part 71a, the submersible agitator 52a agitates the waste water and the biological excess sludge. The waste water is anaerobically treated in the first anaerobic part 71a. The waste water which has moved to the first aerobic part 71b from the first anaerobic part 71a is aerobically treated. Then, the waste water moves from the first aerobic part 71b to the second aerobic part 72b through the communication hole 82a. The waste water is aerobically treated in the second aerobic part 72b and then moves to the second anaerobic part 72a below. After anaerobically treated in the second anaerobic part 72a, the waste water passes through the communication hole 83a to the third anaerobic part 73a in which the waste water is anaerobically treated. The waste water anaerobically treated in the third anaerobic part 73a then goes up to the third aerobic part 73b above, and aerobically treated. In the third aerobic part 73b, the waste water filtered with the separation membrane 78 is pumped up with the pump 80 and taken out from the third aerobic part 73b as treated water through the valve 81.

The slurry sludge in the third anaerobic part 73a is introduced into the fluorine-concentrated sludge tank 15 via an introduction pipe 88 connected with the third anaerobic part 73a in a position near the water level of the third anaerobic part 73a. Fluorine contained in the slurry sludge introduced into the fluorine-concentrated sludge tank 15 is further concentrated by the operation of the microorganisms. Then, for dehydration, the slurry sludge having fluorine further concentrated in the fluorine-concentrated sludge tank 15 is introduced into the filter press 17.

In the fifth embodiment, the waste water and the sludge pass through the first anaerobic part 71a, the first aerobic part 71b, the second aerobic part 72b, the second anaerobic part 72a, the third anaerobic part 73a, and the third aerobic part 73b in this order. That is, the process step of moving the microorganisms contained in the sludge from the anaerobic part to the aerobic part is performed at a plurality of times. Therefore, the fluorine concentrating ability of the microorganisms is increased reliably. Thus, the fifth embodiment is suitable especially for waste water of a very high concentration. When waste water to be treated contains contaminants at high concentrations, it is indispensable to treat the waste water well. Thus, it is preferable to carry out the step of moving the microorganism-containing sludge from the anaerobic part to the aerobic part a plurality of times, as performed in the fifth embodiment. In the fifth embodiment, not only the ability of treating organic matters in waste water, but also the ability of concentrating fluorine increases. Thus, it is possible to treat the fluorine contained in the waste water efficiently.

FIG. 10 shows an example of the residence time of waste water in each part when the concentration of fluorine is high (about 160 ppm) and the TOC concentration is also high (about 4,000 ppm). In the example, the residence time is two days in the first anaerobic part 71a, two days in the first aerobic part 71b, two days in the second aerobic part 72b, two days in the second anaerobic part 72a, four days in the third anaerobic part 73a, four days in the third aerobic part 73b, and three days in the fluorine-concentrated sludge tank 15. An MLSS concentration in the aerobic parts and that in the anaerobic parts are set to 10,000 ppm or more.

FIG. 11 shows an example of the residence time of waste water in each part when the concentration of fluorine is normal (about 80 ppm) and the TOC concentration is high (about 4,000 ppm). In the example, the residence time is two days in the first anaerobic part 71a, two days in the first aerobic part 71b, two days in the second aerobic part 72b, two days in the second anaerobic part 72a, three days in the third anaerobic part 73a, three days in the third aerobic part 73b, and three days in the fluorine-concentrated sludge tank 15. The MLSS concentration in the aerobic parts and that in the anaerobic parts are set to 10,000 ppm or more.

[Sixth Embodiment]

Figure 12:
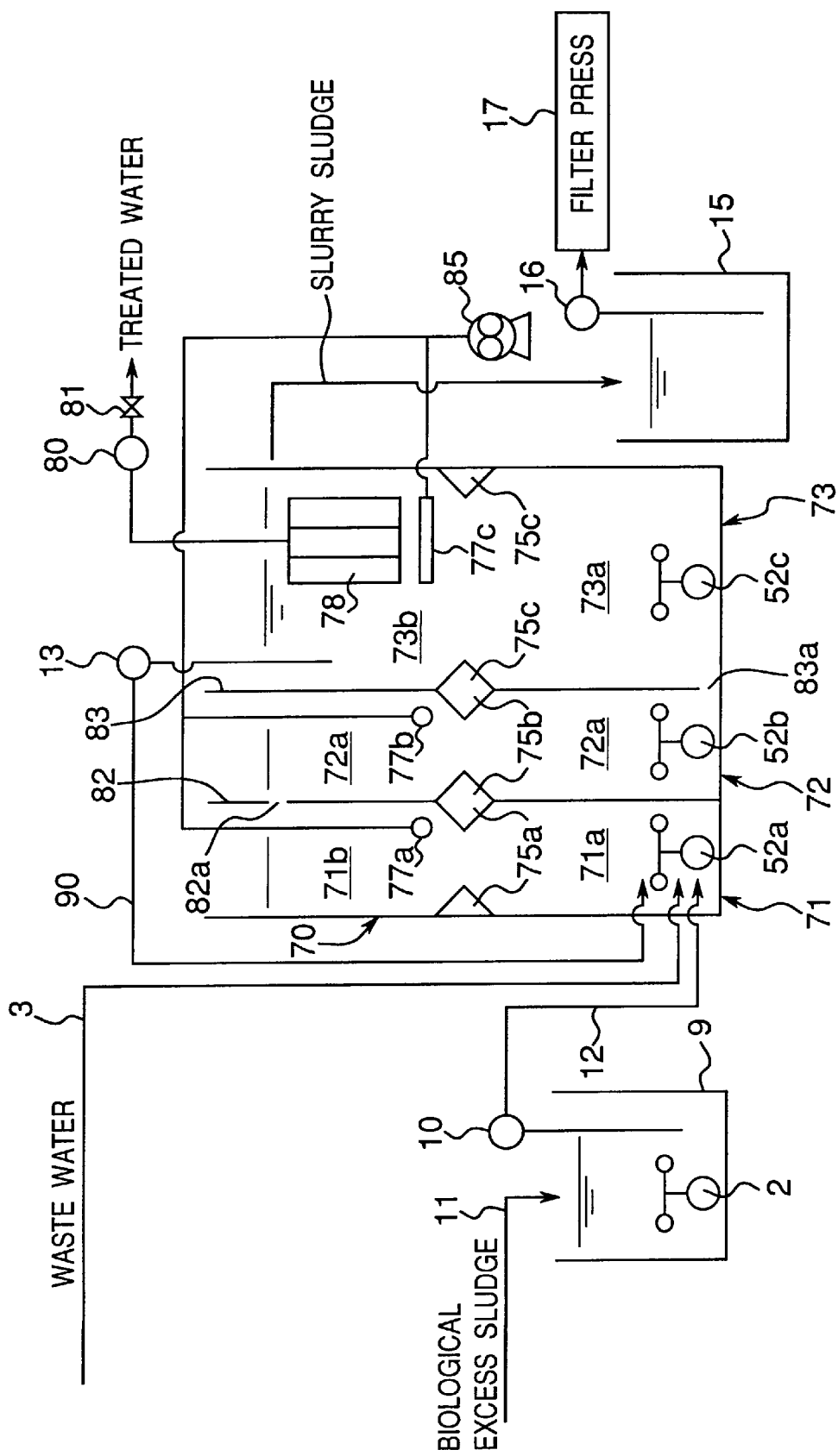
FIG. 12 schematically shows the construction of a waste water treatment apparatus according to a sixth embodiment of the present invention.
Figure 15:
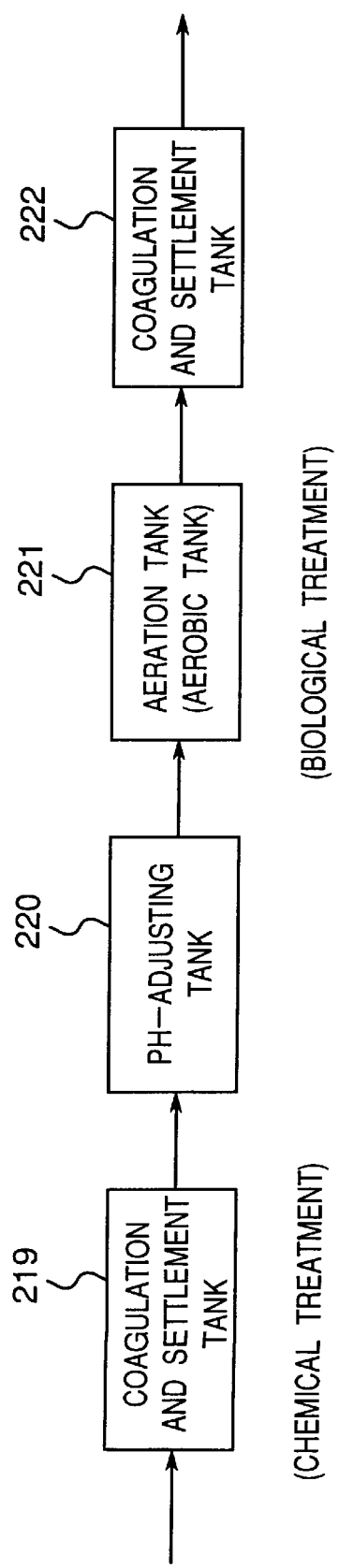
FIG. 15 is an explanatory view explaining a conventional waste water treatment method.
Figure 16:
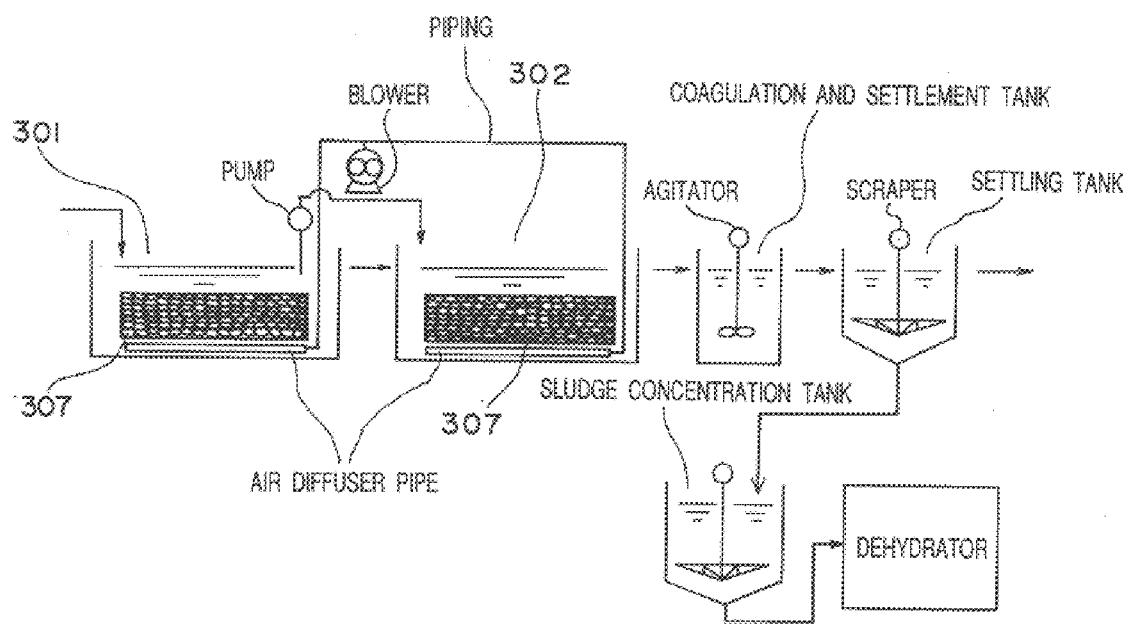
FIG. 16 is an explanatory view explaining another conventional waste water treatment method.

FIG. 12 shows the waste water treatment apparatus of a sixth embodiment of the present invention. The waste water treatment apparatus is different from the fifth embodiment in that in the sixth embodiment, a circulation pipe 90 is additionally provided to return slurry sludge from the third aerobic part 73b to the bottom portion of the first anaerobic part 71a. Accordingly, the following description will be focused on the difference from the fifth embodiment.

In the sixth embodiment, a circulation pump 13 returns the slurry sludge from the third aerobic part 73b, at which water treatment in the main treatment tank 70 terminates, to the first anaerobic part 71a, at which the water treatment in the main treatment tank 70 starts. Thus, the sixth embodiment allows the number of times of shift of the microorganisms from an anaerobic state to an aerobic state to be larger than the fifth embodiment. Thus, the sixth embodiment allows the microorganisms-to have a higher fluorine concentrating capability than the fifth embodiment. Accordingly, the sixth embodiment is superior to the fifth embodiment in fluorine removal percentage. The sixth embodiment is superior to any of the first through fifth embodiments in the capability of treating fluorine and organic matters.

FIG. 13 shows an example of the residence time of waste water in each part when the concentration of fluorine is high (about 160 ppm) and the TOC concentration is high (about 4,000 ppm). In the example, the residence time is two days in the first anaerobic part 71a, two days in the first aerobic part 71b, two days in the second aerobic part 72b, two days in the second anaerobic part 72a, four days in the third anaerobic part 73a, four days in the third aerobic part 73b, and three days in the fluorine-concentrated sludge tank 15. The MLSS concentration in each aerobic part and that in each anaerobic part are set to 10,000 ppm or more.

FIG. 14 shows an example of the residence time of waste water in each part when the concentration of fluorine is normal (about 80 ppm) and the TOC concentration is high (about 4,000 ppm). In the example, the residence time is two days in the first anaerobic part 71a, two days in the first aerobic part 71b, two days in the second aerobic part 72b, two days in the second anaerobic part 72a, three days in the third anaerobic part 73a, three days in the third aerobic part 73b, and three days in the fluorine-concentrated sludge tank 15. The MLSS concentration in each aerobic part and that in each anaerobic part are set to 10,000 ppm or more.

[Experimental Example]

Description is made on an example of an experiment of waste water treatment conducted by using the waste water treatment apparatus of the sixth embodiment. The waste water treatment apparatus used in the experiment had the same construction as that of the waste water treatment apparatus shown in FIG. 12. The first aerobic part 71b and the second aerobic part 72b had a volume of about 50 m$^3$; the third aerobic part 73b, about 100 m$^3$; the first anaerobic part 71a and the second anaerobic part 72a, about 50 m$^3$; the third anaerobic part 73a, about 100 m$^3$; the biological excess sludge tank 9, 40 m$^3$, and the fluorine-concentrated sludge tank 15, 30 m$^3$.

Using the waste water treatment apparatus, fluorine-containing high-concentration organic waste water was treated with only microorganisms and without making chemical treatment. The waste water was 7.6 in pH, 86 ppm in fluorine concentration, and 2,600 ppm in TOC concentration. As a result of the treatment, the pH of the waste water was changed to 7.4, the fluorine concentration decreased to 5 ppm (about 1/17 of the fluorine concentration before treatment), and the TOC concentration decreased to 25 ppm (about 1/100 of the TOC concentration before treatment).

The embodiments have been described taking the case that waste water contains fluorine. The present invention is also applicable to treatment of waste water containing heavy metals such as mercury and lead, and other common metals such as iron and aluminum, and also nonmetals such as phosphorus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of treating waste water containing fluorine at a concentration of at least 30 ppm, without any chemical treatment, comprising the steps of:

introducing sludge containing microorganisms into a treatment tank;

introducing waste water containing fluorine at a concentration of at least 30 ppm into the treatment tank; and treating the waste water only biologically using the microorganisms contained in the sludge while increasing a concentration of the microorganisms in the treatment tank to 10,000 ppm or more in terms of MLSS concentration, wherein fluorine in the waste water is concentrated in the microorganisms.

2. The method according to claim 1, wherein the step of treating the waste water includes a step of moving the microorganisms between an anaerobic part and an aerobic part within the treatment tank, and the step of moving the microorganisms is performed one or more times.

3. The method according to claim 2, wherein in the step of introducing waste water, the waste water is introduced into the anaerobic part of the treatment tank.

4. The method according to claim 2, further comprising a step of filtering the waste water to separate the sludge from the waste water and output the filtered water as treated water, the step of filtering the waste water being performed in the aerobic part of the treatment tank at a final stage of the treatment.

5. The method according to claim 4, further comprising a step of returning the sludge from the aerobic part to the anaerobic part at the final stage of the treatment.

6. The method according to claim 2, wherein the step of moving the microorganisms between an anaerobic part and aerobic part within the treatment tank is performed more than once.

7. The method according to claim 1, wherein the microorganisms are cultured by circulating the microorganisms between an anaerobic part and an aerobic part in the treatment tank.

8. The method according to claim 1, further comprising a step of discharging the sludge containing fluorine concentrated in the microorganisms from the treatment tank after a concentration of the microorganisms in the treatment tank reaches a predetermined value.

9. The method according to claim 1, further comprising a step of concentrating the sludge containing the microorganisms within the treatment tank by a membranous separation device disposed in the treatment tank.

10. The method according to claim 1, further comprising a step of introducing sludge containing microorganisms into a sludge tank for storage of the sludge, and wherein in the step of introducing sludge containing microorganisms into a treatment tank, the sludge stored in the sludge tank is introduced into the treatment tank, and wherein the sludge introduced into the sludge tank includes no sludge discharged from the treatment tank.

11. The method according to claim 10, wherein in the step of introducing sludge containing microorganisms into a sludge tank, a biological excess sludge is introduced into the sludge tank.

* * * * *